United States Patent
Haunerdinger (10) Patent No.: US 7,227,328 B2
(45) Date of Patent: Jun. 5, 2007

(54) METHOD FOR DETECTING A POSSIBLE COLLISION OF AT LEAST TWO OBJECTS MOVING WITH RESPECT TO EACH OTHER

(75) Inventor: Josef Haunerdinger, Vachendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/313,494

(22) Filed: Dec. 19, 2005

(65) Prior Publication Data

US 2006/0176001 A1    Aug. 10, 2006

(30) Foreign Application Priority Data

Dec. 20, 2004    (DE) .................. 10 2004 062 163

(51) Int. Cl.
*G05B 19/18* (2006.01)
(52) U.S. Cl. .................. 318/569; 318/567; 318/576; 318/594
(58) Field of Classification Search .......... 318/569, 318/567, 560, 576, 594, 649, 652; 340/70; 342/70
See application file for complete search history.

(56) References Cited

U.S. PATENT DOCUMENTS 4,578,757 A    3/1986    Stark 5,056,031 A    10/1991    Nakano et al.
2005/0156779 A1*    7/2005    Wixforth ................ 342/70

FOREIGN PATENT DOCUMENTS

| EP | 0 268 317 | 5/1988 |
|----|-----------|--------|
| EP | 0 412 619 | 2/1991 |
| EP | 0 426 249 | 5/1991 |

* cited by examiner

*Primary Examiner*—Karen Masih
(74) *Attorney, Agent, or Firm*—Kenyon & Kenyon LLP

(57) ABSTRACT

A method is for detecting a possible collision of at least two objects moving with respect to each other by simulating the intended relative motion of the two objects. At least one of the objects is assigned an envelope surrounding the object, the path line represents the relative motion of the objects is covered in steps of a defined step size, and the occurrence of an overlap of the objects is detected for ascertaining a possible collision of the objects. For at least one object, the outer contour of the corresponding envelope is used as a datum for detecting an overlap. At least one object is assigned an inner and an outer envelope, of which the inner envelope surrounds the object and the outer envelope surrounds the inner envelope. The outer envelope is used as a datum for detecting an overlap of the two objects, and when an overlap is detected in a segment of the path line, the segment of the path line is re-traversed using a smaller, second step size. When the segment of the path line is re-traversed, the inner envelope of at least one of the objects is used as a datum for detecting an overlap.

16 Claims, 5 Drawing Sheets

METHOD FOR DETECTING A POSSIBLE COLLISION OF AT LEAST TWO OBJECTS MOVING WITH RESPECT TO EACH OTHER

CROSS-REFERENCE TO RELATED APPLICATIONS

The present application claims priority to Application No. 10 2004 062 163.2, filed in the Federal Republic of Germany on Dec. 20, 2004, which is expressly incorporated herein in its entirety by reference thereto.

FIELD OF THE INVENTION

The present invention relates to a method for detecting a possible collision of at least two objects moving with respect to each other.

BACKGROUND INFORMATION

In such a method, the intended relative movement of the at least two objects moving with respect to each other is simulated, where at least one of the objects is assigned an envelope surrounding the object. The path line representing the relative movement of the two objects is then covered in steps of a defined step size. To detect a possible collision of the objects, the occurrence of an overlap of the two (simulated) objects is detected while the path line is covered. For at least one of the objects, the outer contour of the corresponding envelope is used as a datum for detecting an overlap.

Such methods may be used for monitoring collisions of machine-tool parts moving relative to one another, such as a supporting table, a booth wall, a tool, a spindle head, etc., in order to be able to detect possible collisions early and prevent them with the aid of the machine control unit.

In order to be able to make the calculations necessary for simulating the movement of the individual machine parts at a sufficient rate, the objects to be monitored, e.g., those having a complicated geometric structure, are represented by an envelope that surrounds the object in question. The simulation for the collision monitoring is then conducted not on the basis of the actual geometry of the objects moving relative to each other, but rather on the basis of the geometry of the envelope, which is assigned to a specific object and is normally made of solids having a simple geometry, such as spheres, rectangular parallelepipeds, cylinders, prisms, and pyramids. Therefore, while carrying out the simulation for early detection of collisions of such objects to be monitored, which are assigned an envelope having a simple geometry, the monitoring is not focused on an overlap of the object itself and another object or its envelope, but rather on a possible overlap of the envelope assigned to the object and another object or an envelope assigned, in turn, to the other object.

In this context, the path line representing the relative movement of objects, which are moving with respect to each other and are monitored for a collision, describes the possible relative positions, which these objects may assume during the operation of a specific control program, e.g., one stored in a machine control unit. Therefore, in the case of a machine tool, the individual points of the path line correspond to a particular position of the monitored objects with respect to the machine axes of the machine tool, and namely, in view of both linear movements along the individual machine axes and rotational movements about the machine axes. Accordingly, a path line is generally understood as the set of all the relative positions, which the objects to be monitored for a collision may assume during a defined relative movement, e.g., one selected by a control program. The corresponding simulation for detecting a possible collision is conducted in the machine control unit or in a processor coupled to the machine control unit, so that the machine control unit is able to prevent a collision of the actual objects to be monitored, e.g., by stopping the relative motion or changing the relative motion.

The phrase used below that "the outer contour of the envelope assigned to the specific object is used as a datum" for detecting an overlap, i.e., mutual penetration of two objects, during the simulation means that when an overlap or mutual penetration of two (simulated) objects to be monitored is detected, the specific, actual geometries of the two objects are not used as a datum for determining overlap, but rather the envelope assigned to a specific object and the other object or the envelope assigned to a specific object and the envelope assigned to the other object are used as a datum for determining overlap, if the other object is assigned an envelope. Therefore, in the case in which the two objects to be monitored are each assigned an envelope, the mutual penetration of the two envelopes is taken into account. If only one of the two objects is assigned an envelope, the overlap of this envelope and the other object is taken into account.

A method for collision monitoring of the type described above is described, e.g., in European Published Patent Application No. 0 268 317. In this method, there is believed to be the problem that in order to reliably detect a possible collision of two objects moving with respect to each other, the path line representing the relative positions of the objects to be monitored must be covered using a step size that is as small as possible, since path-line points at which there is the danger of a collision may be skipped when the utilized step size is too large. This conflicts with the need to carry out the collision monitoring, using as little computing time as possible.

SUMMARY

Example embodiments of the present invention may provide improved collision-monitoring methods.

According to an example embodiment of the present invention, at least one of the objects to be monitored is assigned, during the simulation, an inner and an outer envelope, of which the inner envelope surrounds the corresponding object and the outer envelope surrounds the inner envelope and is set apart from it. The outer envelope of the at least one object is initially used as a datum for detecting an overlap of the objects moving with respect to each other. After detection of an overlap on this basis, the overlap-affected segment of the path line representing the relative motion of the two objects is re-traversed using a smaller, second step size. When this segment of the path line is re-traversed for detecting an overlap, the inner envelope of at least the one object is used as a datum.

In many instances, the monitored objects moving toward each other may have such a spacing from each other, that exact collision monitoring, using an envelope that is adjusted exactly as possible to the body to be monitored, and using a correspondingly small step size, may not be necessary. In this regard, rough monitoring with the aid of a larger outer envelope is performed instead, the larger outer envelope justifying a correspondingly large step size. When a sufficiently large envelope is used for collision monitoring, an overlap indicating a collision danger is more likely produced, so that even when a larger step size is used, it may be ensured that no possible collision is overlooked. In this context, a suitable ratio of the size of the outer envelope with respect to the size of the object to be monitored, to the assigned step size is to be determined, in each case, on the basis of the characteristics of the object to be monitored and the geometry of the utilized envelope solid.

In this context, both the sequential steps of the larger step size and the sequential steps of the smaller step size are selected such that they immediately follow one another. The steps of the large step size cover the entire path line, along which the two objects to be monitored are moving with respect to each other, and e.g., (but not necessarily) without overlap of the individual, sequential steps. The same applies to the second steps having a smaller step size, based on a specific subsection of the path line. In this context, the individual steps are each discrete and finite.

Collision monitoring with the aid of larger envelope bodies assigned to the individual objects may have the considerable disadvantage that an overlap of the utilized envelope bodies will be often observed as well, when the assigned objects themselves actually do not overlap at all. However, this supposed disadvantage may be eliminated by the method hereof, in that upon detection of an overlap of the larger outer envelope bodies, the presence of a collision is not yet automatically assumed, but rather the presence of a collision is checked again, e.g., using as a datum the corresponding, smaller, inner envelope bodies assigned to one monitored object each, and using a correspondingly smaller, finer-stepped step size while covering such a segment of the path line, on which the danger of a collision was indicated by an overlap, using the larger, outer envelope as a datum.

In the following description, two objects moving with respect to each other are used as a datum for determining a collision. However, the method hereof is also applicable in instances in which more than two objects moving with respect to each other are to be monitored. A collision is to be assumed when the simulation of two of the objects to be monitored or the envelopes assigned to these objects indicates an overlap. In this respect, when more than two objects moving with respect to each other are monitored for a collision, there is always the problem of detecting, in each instance, the collision of at least two of the objects to be monitored.

The inner envelope may be set apart from all points of the outer envelope of the corresponding object by a finite, minimum distance, and the outer envelope may be set apart from all points of the corresponding inner envelope by a finite, minimum distance, so that the specific outer envelope is set apart from the corresponding object by a greater minimum distance than the respective inner envelope. In principle, the inner envelope may contact individual points of the object to be monitored, and the outer envelope may, however, contact individual points of the corresponding inner envelope.

The first, rough step size, with the aid of which a possible collision of the objects to be monitored may be detected, using the outer envelope of the corresponding object as a datum, is set, in each instance, as a function of the minimum distance of the outer envelope from the outer contour of the assigned object. The greater the distance between the outer envelope and the monitored object surrounded by it, the greater the selected first step size may be without the risk of overlooking a possible collision.

The smaller, second step size, which is used when a path-line segment regarded as a collision risk is retraced, is correspondingly a function of the minimum distance of the inner envelope from the corresponding object to be monitored.

In addition, the selected step size may also be set from the shape of the path line, i.e., the type of relative motion of the two objects to be monitored, and additionally as a function of the absolute size of the individual envelope bodies. Thus, for setting the specific step size, it may be, for example, important if the movements to be monitored are linear movements or rotational movements, since in the case of rotational movements, one and the same angular change may produce very different traveled distances as a function of the radius of the path line tracing the movement.

A monitored relative movement of two objects moving with respect to each other is often a combination of linear and rotational movements.

For machine tools that include a plurality of objects, which move with respect to one another and may be included in the collision monitoring, a considerable reduction in the computational work may be achieved by not expanding the collision monitoring to the relative motion of objects moving with respect to each other, in the case of which the construction of the machine tool precludes a collision from the outset. Thus, for example, a pivoted supporting table (rotary table) cannot collide with a stationary outer booth surrounding the rotary table along a circular path, for in the case of a pure rotational movement of the rotary table, the distance between the rotary table and the outer booth always remains constant. The monitoring of these two objects for a collision would then require unnecessary computational time.

In addition, an entire, cohesive object or machine part of machine may not necessarily be surrounded by an envelope. If only a subsection of an object or a machine part may possibly be considered for a collision with a further object or machine part, this subsection of a complete object or machine part may be regarded as the object to be monitored, and accordingly, only this subsection may be surrounded by an envelope. The object or machine part to be monitored should be understood to be the component or sub-component of, e.g., a machine tool, which is actually to be included in collision monitoring and is therefore assigned a corresponding envelope for modeling.

According to an example embodiment of the present invention, a method for detecting a possible collision of at least two objects movable with respect to each other by simulating an intended relative motion of the objects includes: (a) assigning to at least one of the objects an inner envelope that surrounds the object and an outer envelope that surrounds the inner envelope; (b) traversing a path line that represents the relative motion of the objects in steps of a selected, first step size; (c) during the step (b), detecting whether an overlap of the objects occurs to ascertain a possible collision of the objects, the outer envelope of at least one object used as a datum for detecting the overlap of the objects; (d) if an overlap is detected in the step (c) in a segment of the path line, re-traversing the segment of the path line using a second step size smaller than the first step size; (e) during the step (d), detecting whether an overlap of the objects occurs, the inner envelope of at least one object used as a datum for detecting the overlap of the objects.

The method may include (f) assigning to another one of the objects an envelope used as a datum for detecting an overlap of the objects in at least one of the steps (c) and (e).

The another one of the objects may be assigned an inner envelope and an outer envelope in the step (f), the outer envelope of the another one of the objects may be used as a datum for detecting the overlap of the objects in the step (c), and the inner envelope of the another one of the objects may be used as a datum for detecting the overlap of the objects in the step (e).

The inner envelope may be set apart from all of points of an outer contour of the object.

The outer envelope may be set apart from all points of the inner envelope of the object.

The first step size may be a function of a minimum distance of the outer envelope from the object.

The second step size may be a function of a minimum distance of the inner envelope from the object.

The first step size may be less than twice a minimum distance from a first object to the outer envelope of the first object plus twice a minimum distance of a second object to the outer envelope of the second object.

The second step size may be less than twice a minimum distance from a first object to the inner envelope of the first object plus twice a minimum distance of a second object to the inner envelope of the second object.

The first step size and the second step size may be functions of a shape of the path line.

The path line may represent at least one of (a) relative linear movement and (b) relative rotational movements of the objects with respect to each other.

Each object may one of (a) correspond to one of at least two machine parts that are movable with respect to each other and (b) be arranged on one of at least two machine parts that are movable with respect to each other, and the machine parts may be arranged as components of a machine tool.

The objects may represent objects for which a collision is physically possible during normal operation of the machine tool.

The steps (a) to (e) may be performed by simulation by a machine control unit.

The machine control unit may be adapted to control real movement of the objects as a function of a result of the simulation.

The machine control unit may be adapted to only allow a movement of real objects with respect to each other after performing the steps (a) to (e) for the path line.

Further details and aspects hereof are described in more detail below with reference to the appended Figures.

DETAILED DESCRIPTION

Figure 1:
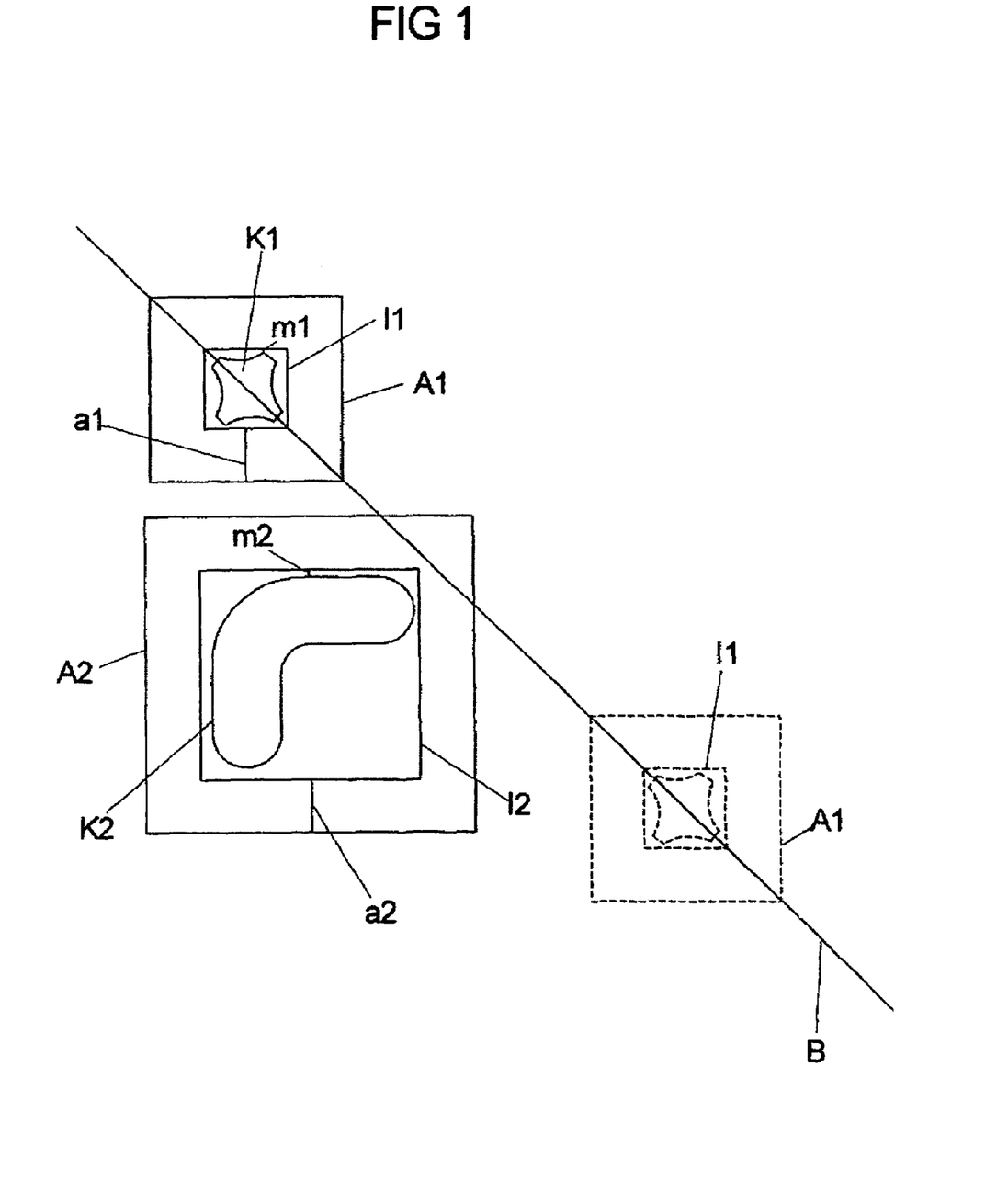
FIG. 1 illustrates two objects, which move with respect to each other and are each assigned an inner envelope and an outer envelope for collision monitoring.

Illustrated in FIG. 1 are two objects moving with respect to each other in the form of two bodies K1, K2, which may be machine parts of a machine tool, and which, within the scope of the working steps to be executed by the machine, may be moved with respect to each other along a path line B specified by the machine control unit.

In order to determine if the intended relative movement of the two bodies K1, K2 along a path line B, specifiable by the machine control unit, may result in a collision of the two bodies K1, K2, their relative motion is simulated by the machine control unit or a processor coupled to the machine control unit, prior to the actual execution of the corresponding machine operations. Therefore, it is checked in advance if contact of the two bodies K1, K2 would occur in the case of a movement of the two bodies K1, K2 along path line B. In such a situation, the corresponding machine operation may not be carried out.

To carry out this collision monitoring in a simulation, each of the two bodies K1, K2 to be monitored is assigned an inner envelope I1, I2 and an outer envelope A1, A2. This is used to simplify the collision monitoring, since the generally complicated geometric structure of machine parts to be monitored may cause collision monitoring based on the actual geometry of each machine part to be monitored to result in computational expenditure that is too high.

Accordingly selected for collision monitoring are comparatively simple, geometric (envelope) solids, such as spheres, rectangular parallelepipeds, cylinders, prisms, pyramids, etc., which may be combined with each other for modeling particular machine parts. See, for example, the article of G. Pritschow and M. Kremer in "wt Werkstatttechnik online" ("wt Workshop Technology online"), Volume 92, Pages 218 to 222 (2002) and the materials referred to therein for details regarding the selection of suitable modeling of machine parts at risk for collisions, as well as appropriate algorithms for ascertaining a possible overlap of the modeled machine parts.

Figure 2:
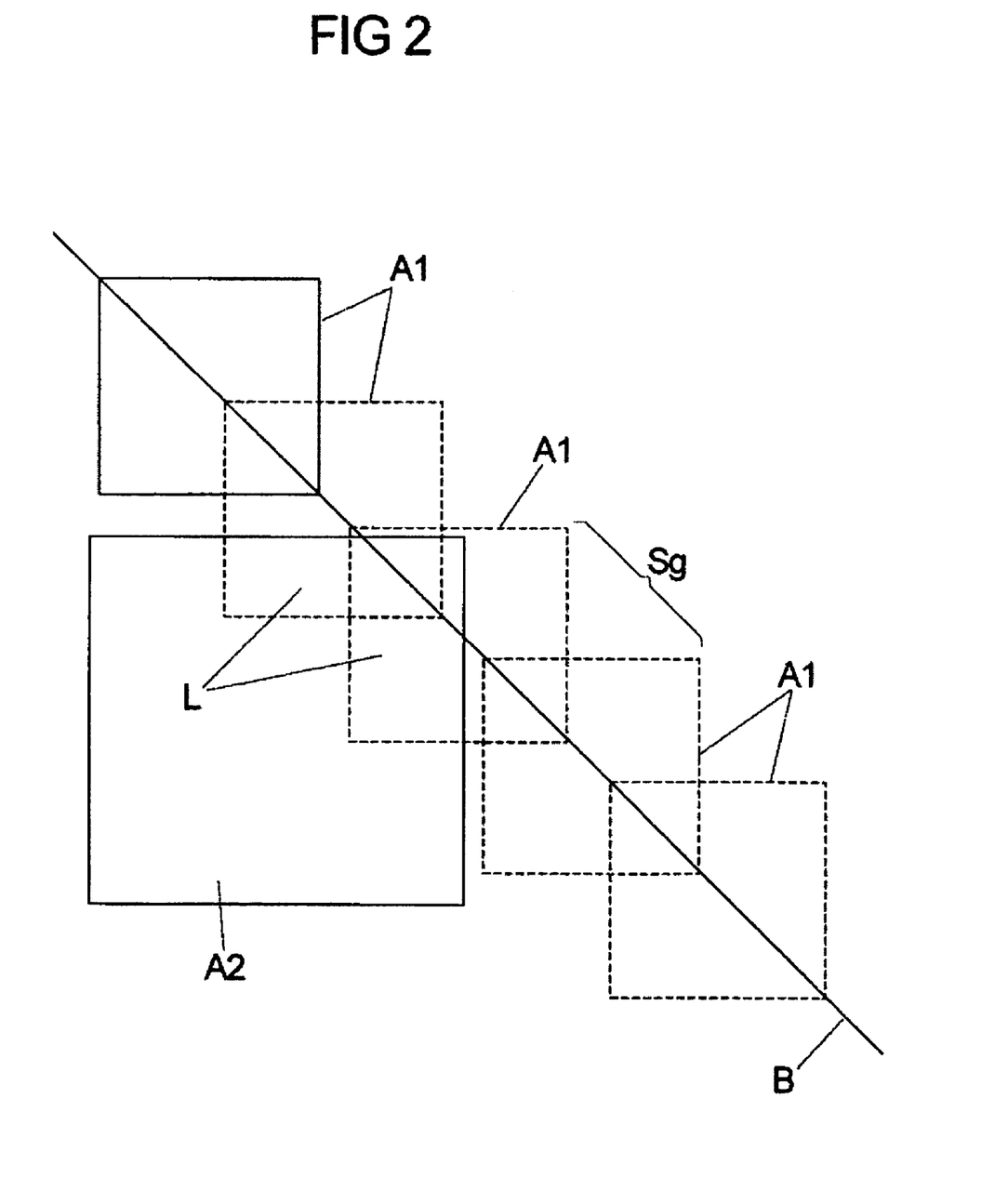
FIG. 2 illustrates collision monitoring in the case of a relative movement of the two objects illustrated in FIG. 1 along a path line, using their respective outer envelopes as a datum.
Figure 3:
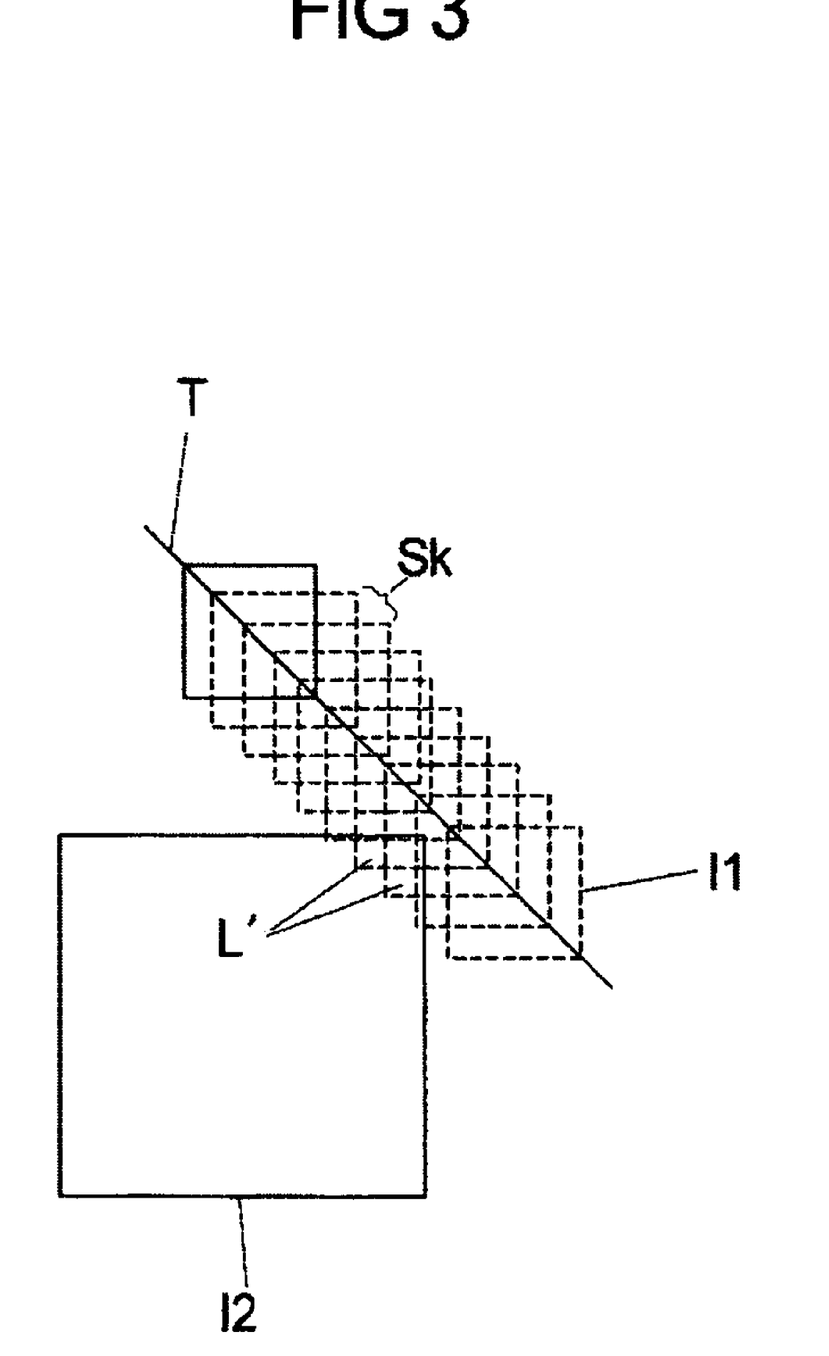
FIG. 3 illustrates refined collision monitoring in the case of the motion of the two objects illustrated in FIG. 1 in a subsection of the path line illustrated in FIG. 2, using their respective inner envelopes as a datum.

An aspect of the method for collision detection described below with reference to FIGS. 2 and 3 is that according to FIG. 1, each of the two bodies K1, K2 to be monitored is not only assigned a single envelope modeling the respective body, as is conventional, but rather an inner envelope I1, I2 and an outer element A1, A2, respectively. In this context, inner envelopes I1, I2 surround assigned bodies K1, K2, respectively, and are set apart from the outer contours of assigned bodies K1, K2, respectively, by minimum distances M1, M2, respectively. Outer envelopes A1, A2 surround inner envelopes I1, I2, respectively, of assigned bodies K1, K2, respectively, and are set apart from them by selected, minimum distances a1, a2, respectively. If the inner envelope and the corresponding outer envelope were to be alternatively formed by concentric circles, then the last-mentioned distances would be constant for all points of the envelopes in question.

Bodies K1, K2 to be monitored may each be represented as two-dimensional objects and corresponding envelopes I1, A1 and I2, A2 may each be represented as squares, inner squares I1, I2 each directly surrounding one of bodies K1, K2 at selected, minimum distances m1, m2, respectively, and outer squares A1, A2 each surrounding an assigned, inner square I1, I2 at selected, minimum distances a1, a2, respectively.

Generalized to the three-dimensional case, the squares may each be replaced by cubes or, more generally, by rectangular parallelepipeds. However, as explained further above, other envelope solids, such as spheres, cylinders, prisms, pyramids, etc., as well as a combination of such simple geometric solids, may be used for modeling monitored bodies K1, K2 in the form of specific machine parts.

Path line B, which represents the relative positions of bodies K1, K2 to be monitored for a collision, is illustrated as a straight line. However, the subsequently described method for collision monitoring may also be applied in a similar manner to relative rotational movements of two bodies, as well as to relative movements in general, which are described by a curved path line and are made up of, for example, a combination of linear and rotational movements.

When carrying out the collision check, FIG. 2 provides for path line B to be initially traversed using a comparatively large step size Sg, and for the possible occurrence of a collision between the two bodies moving relative to each other to be checked on the basis of an overlap or a mutual penetration of outer envelopes A1 and A2 of the bodies examined for a collision. If such an overlap L of outer envelopes A1, A2 is detected in one of the steps, then this is an indication that there is a risk of a collision of the two monitored bodies in a subsection of path line B, in which the corresponding step was executed. However, this does not necessarily mean that such a collision would also actually occur in the corresponding subsection of path line B. In this regard, the occurring overlap L may also be exclusively attributable to the particular size of outer envelopes A1, A2 of the bodies to be monitored.

Therefore, as illustrated in FIG. 3, the subsection T of path line B, in which the overlap of outer envelopes A1, A2 produces a risk of a collision, is re-traversed using a smaller step size Sk, the risk of a collision now being checked on the basis of the overlap of smaller, inner envelopes I1, I2 assigned to the two bodies to be monitored. If an overlap L' also occurs here, then this is an indication that there is actually a risk of a collision of the two monitored bodies while covering path line B, and that the path line should be appropriately corrected, e.g., by reprogramming a machine control unit, when the two bodies moving with respect to each other are two machine parts whose relative motion is determined by the machine control unit.

Specifically, the defining of a particular subsection T of path line B, which is re-traversed using a smaller step size Sk, may be carried out such that it includes, in each instance, all of the sequential steps of larger step size Sg, which were assigned an overlap L of outer envelopes A1, A2 during the first tracing of path line B. Therefore, a subsection T begins, in each instance, at the starting point of a first step of larger step size Sg, where an overlap L of outer envelopes A1, A2 was detected, and includes all of the subsequent steps of larger step size Sg, where an overlap L of outer envelopes A1, A2 was detected, up to the starting point of the subsequent, first step of larger step size Sg, where no overlap L of the two bodies K1, K2 was detected. In this context, the sequential steps of larger step size Sg are selected to directly follow one another (in the same manner as the sequential steps of smaller step size Sk). Therefore, the steps of large step size Sg cover entire path line B, along which the two objects to be monitored K1, K2 are moving with respect to each other, and, e.g., (but not necessarily) without overlap of the individual steps. The same applies to smaller steps Sk of subsection T of path line B.

In the instance in which an overlap L of outer envelopes A1, A2 was only detected during a single step of larger step size Sg while covering path line B for the first time, corresponding subsection T of path line B extends exactly between the two end points of that step of larger step size Sg.

If an overlap L of outer envelopes A1, A2 was detected in several sequential steps of larger step size Sg, subsection T of path line B extends between the starting point of the first step in which an overlap L was detected, and the end point of the last step of larger step size Sg, up to which an overlap L was continuously detected.

When path line B, which represents the relative motion of the two bodies K1, K2 to be monitored, is covered, several subsections T may be ascertained, along each of which a continuous overlap L of outer envelopes A1, A2 is detected while advancing using first, larger step size Sg. Each of these individual subsections T is then to be checked more precisely by covering them again using smaller step size Sk.

The above-described collision monitoring in the form of first, rough monitoring, using a large step size and correspondingly large, outer envelope solids, and in the form of the second, more accurate monitoring, especially of the path-line subsections determined to be significant with respect to collisions in the first, rough monitoring, may permit the possible collisions actually present to be reliably detected using a comparatively small amount of computational work. However, at the same time, a collision is not allowed to be assumed and the ongoing machine operation is not allowed to be stopped solely on the basis of the overlap of the larger, outer envelopes, which allow coverage of relevant path line B with the aid of large step size Sg.

Depending on the extent of the relative movements of the monitored machine parts to be expected during operation of a machine, rough collision monitoring may be completely executed prior to the beginning of the intended machine operations or executed dynamically while the machine operations are carried out, but at such an interval prior to the respective machine operation, that after the occurrence of an overlap L of envelopes A1, A2 of the bodies involved, sufficient time is still available for undertaking more accurate collision monitoring of their inner envelopes I1, I2 and timely aborting a machine operation that would lead to a collision, as a function of the result of this more accurate collision monitoring.

The risk that a machine is stopped due to an erroneously ascertained, imminent collision decreases with decreasing maximum distance of inner envelopes I1, I2 from corresponding bodies K1, K2, i.e., with increasing accuracy of the inner envelopes' I1, I2 modeling of corresponding bodies K1, K2 to be monitored. However, the computational expenditure necessary for the collision monitoring increases with more accurate modeling, it being necessary to take into account that the smaller the minimum distance of inner envelopes I1, I2 from the assigned bodies to be monitored, the smaller the step size Sk must be selected to be. In the instance in which the inner envelopes model the assigned bodies so exactly that the model and the respective body to be monitored effectively coincide, the refined collision monitoring would have to be carried out continuously, i.e., using an infinitely small step size.

Figure 4:
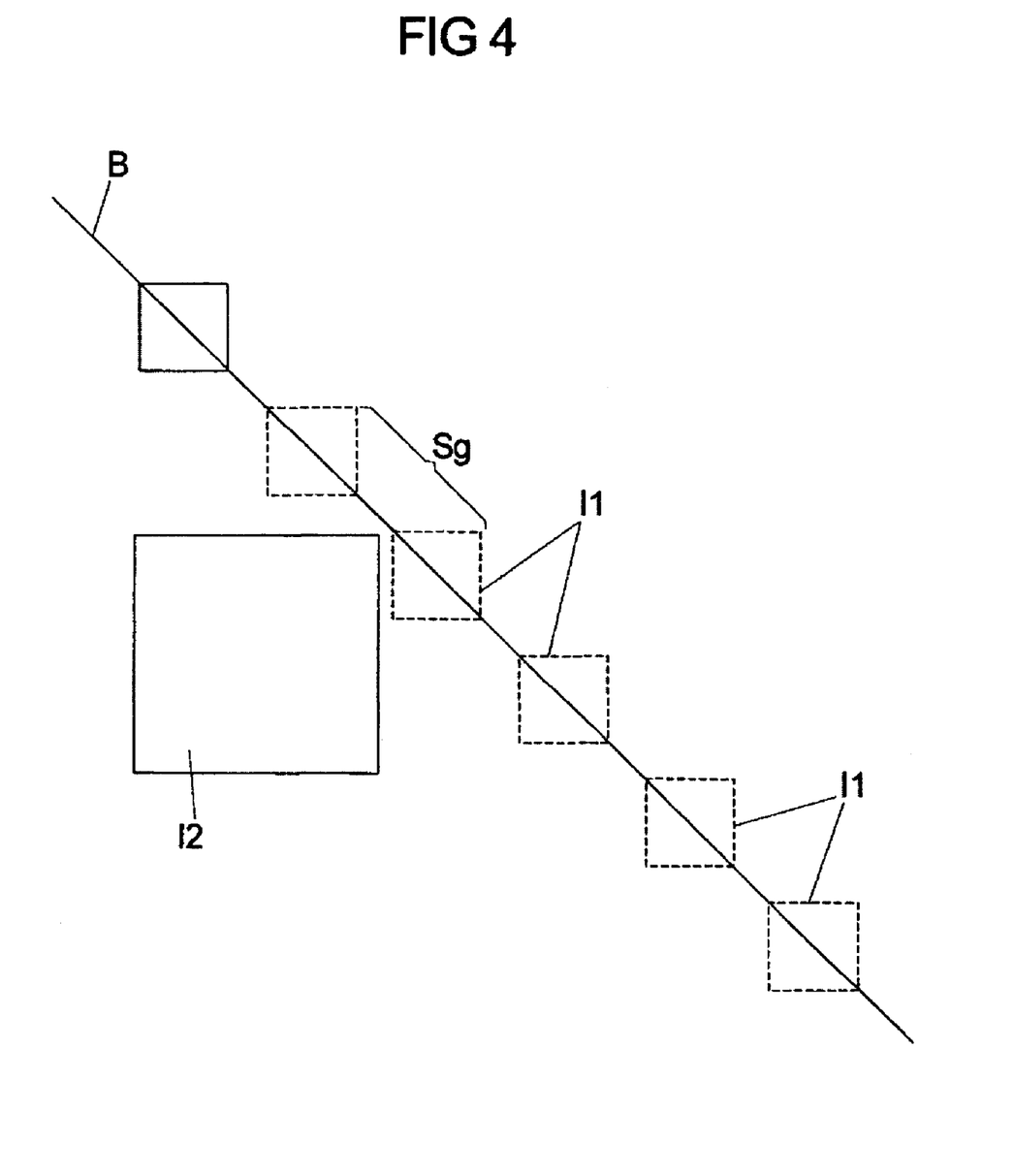
FIG. 4 illustrates disadvantages that are believed to be associated with collision monitoring, in which only one envelope is assigned to each object.

Referring to FIG. 4, it should be apparent that covering path line B, which traces the relative motion of the two bodies to be monitored for collision, using larger step size Sg, while simultaneously using smaller, inner envelopes I1, I2 as reference objects for the detection of an overlap, could have led to the possible collision discovered, as illustrated in with FIGS. 2 and 3, being ignored.

Therefore, when path line B is covered using a large step size Sg, correspondingly large envelope solids A1, A2 are also used as models for the bodies to be monitored, and when path line B is sampled more accurately using smaller, inner envelopes I1, I2 as a datum for determining an overlap, a correspondingly small step size Sk is also used.

Figure 5:
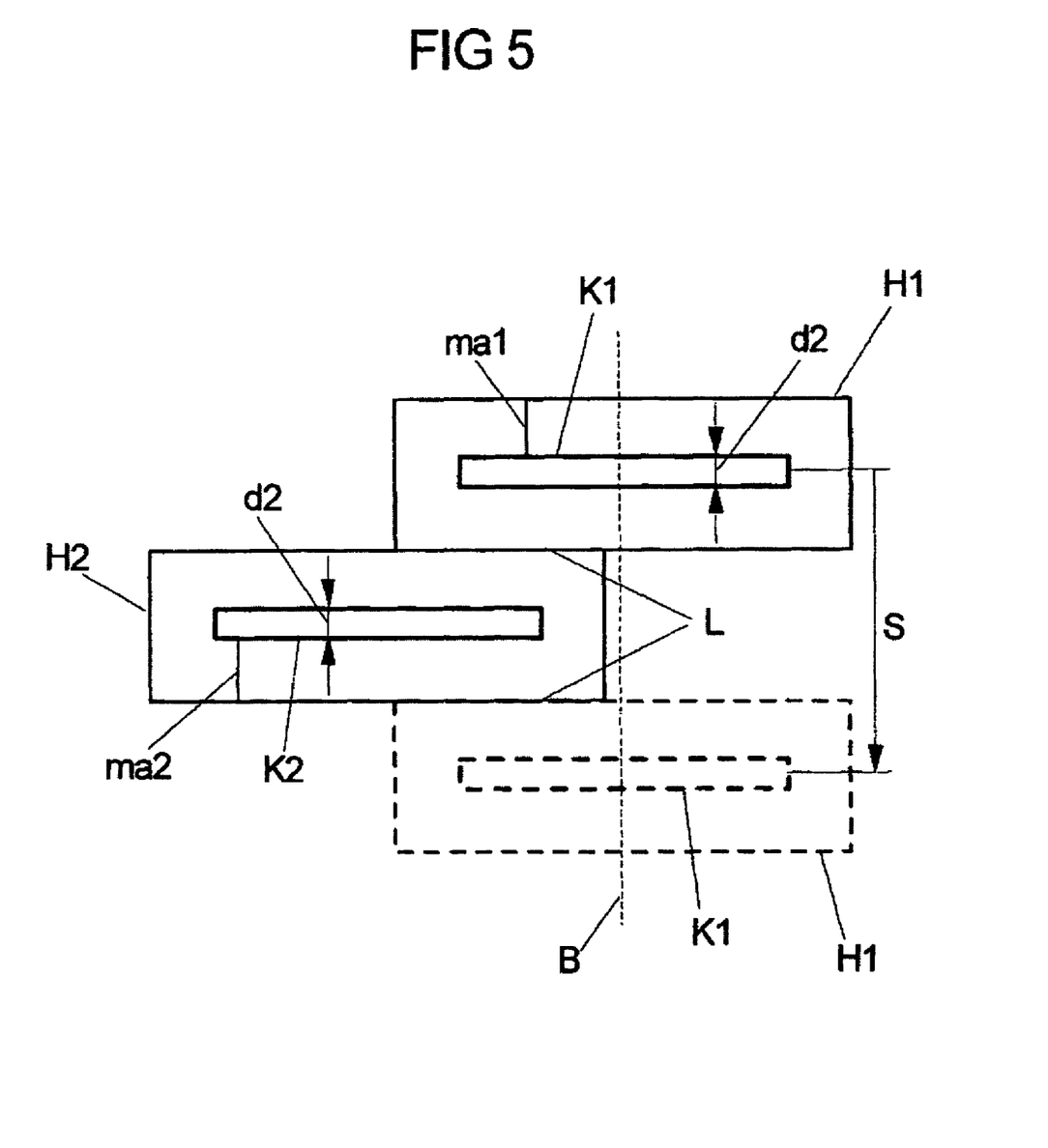
FIG. 5 illustrates ascertaining a suitable step size for covering a specific path line.

Illustrated in FIG. 5 are considerations, on the basis of which a suitable step size may be ascertained for the first tracing of path line B, as well as for the subsequent tracing of subsection T of path line B.

In this context, FIG. 5 starts out from a worst-case scenario, i.e., a collision case in which a particularly fine step size is necessary for detecting the collision of bodies K1, K2 to be monitored, i.e., an overlap of assigned envelopes H1, H2. As for the principle, the following apply to both the setting of first, large step size Sg and the setting of second, smaller step size Sk. Therefore, the envelopes referred to as H1 and H2 may be selected to stand for outer envelopes A1, A2 or for inner envelopes I1, I2 of the method represented by FIGS. 1 to 3.

In the scenario illustrated in FIG. 5, two monitored bodies K1, K2 having arbitrarily small thicknesses d1, d2, respectively, i.e., the limiting case of d1 approaching zero and d2 approaching zero, is used as a starting point. In this context, path line B, along which the two bodies K1, K2 move with respect to each other, travels at right angles to the extension of the two bodies K1, K2, i.e., dimensions d1 and d2 of the two bodies K1, K2 parallel to path line B are extremely small or approach zero.

As illustrated in FIG. 5, it is additionally assumed that in the case of the step of first body K1 along path line B, having a step size S (which may stand for smaller step size Sk or larger step size Sg), second body K2 is arranged exactly halfway between the starting point and the end point of the specified step of step size S.

In this context, envelopes H1, H2 surround assigned bodies K1, K2, respectively, at minimum distances ma1, ma2, respectively. For the situation in which envelopes H1, H2 in question represent inner envelopes I1, I2, respectively, these minimum distances ma1, ma2 correspond to minimum distances m1, m2, respectively, between inner envelopes I1, I2 and assigned bodies K1, K2, respectively, illustrated in FIGS. 1 to 3. For the case in which envelopes H1, H2 illustrated in FIG. 2 are outer envelopes A1, A2, respectively, of the exemplary embodiment illustrated in FIGS. 1 to 3, minimum distances ma1, ma2 correspond to the minimum distances between bodies K1, K2 and outer envelopes A1, A2, respectively.

As illustrated in FIG. 5, first body K1 collides with second body K2, when first body K1 moves relative to second body K2 along path line B. Such a collision must be detected when path line B is covered using discrete, finite steps having a particular step size S, whereby a collision between the two bodies K1, K2 should be detected on the basis of an overlap of assigned envelopes H1, H2.

In the limiting case of d1 approaching zero and d2 approaching zero, FIG. 5 illustrates that at least a minimal (infinitesimal) overlap L (i.e., contact) between the two envelopes H1, H2 occurs during the above-mentioned step of step size S, when maximum step size S is equal to the sum of two times the two minimum distances ma1 and ma2, i.e., $S \leq 2*ma1+2*ma2$.

In the situation of finite dimensions of the two bodies K1, K2 in the direction of path line B, i.e., d1>0 and d2>0, step size S may be further increased by the amount d1+d2. However, if one neglects the dimensions of the two bodies K1, K2 in the direction of path line B, then the relationship $S<2*ma1+2*ma2$ indicates a rule for step size S, by which collisions between the two bodies K1, K2 may be reliably detected via an overlap L of corresponding envelopes H1, H2.

When using this rule, one should consider, however, that in the case of curved path lines and bodies having finite dimensions, e.g., in the situation of relative movements that are described by a circular path, the individual points of the specific body move using step sizes that vary as a function of the distance from the center of the correspondingly curved movement (e.g., circular movement), given a specific, defined step. Thus, e.g., in the case of a movement along a circular path, the local step size is largest for the points of a body, which are furthest removed from the center of the circle describing the corresponding circular path. That is, it should be considered that, in the case of curved path lines B, e.g., circular paths, the step size is generally locally resolved for the individual points of a body K.

A step size optimal in the specific individual case may be ascertained with the aid of a combination of mathematical estimations, e.g., ones of the type mentioned above, using empirical values, e.g., when the body to be monitored and the path line along which the two bodies move with respect to one another have complicated geometries.

What is claimed is:

1. A method for detecting a possible collision of at least two objects movable with respect to each other by simulating an intended relative motion of the objects, comprising:
   (a) assigning to at least one of the objects an inner envelope that surrounds the object and an outer envelope that surrounds the inner envelope;
   (b) traversing a path line that represents the relative motion of the objects in steps of a selected, first step size;
   (c) during the step (b), detecting whether an overlap of the objects occurs to ascertain a possible collision of the objects, the outer envelope of at least one object used as a datum for detecting the overlap of the objects;
   (d) if an overlap is detected in the step (c) in a segment of the path line, re-traversing the segment of the path line using a second step size smaller than the first step size;
   (e) during the step (d), detecting whether an overlap of the objects occurs, the inner envelope of at least one object used as a datum for detecting the overlap of the objects.

2. The method according to claim 1, further comprising (f) assigning to another one of the objects an envelope used as a datum for detecting an overlap of the objects in at least one of the steps (c) and (e).

3. The method according to claim 2, wherein the another one of the objects is assigned an inner envelope and an outer envelope in the step (f), the outer envelope of the another one of the objects used as a datum for detecting the overlap of the objects in the step (c), the inner envelope of the another one of the objects used as a datum for detecting the overlap of the objects in the step (e).

4. The method according to claim 1, wherein the inner envelope is set apart from all of points of an outer contour of the object.

5. The method according to claim 1, wherein the outer envelope is set apart from all points of the inner envelope of the object.

6. The method according to claim 1, wherein the first step size is a function of a minimum distance of the outer envelope from the object.

7. The method according to claim 1, wherein the second step size is a function of a minimum distance of the inner envelope from the object.

8. The method according to claim 6, wherein the first step size is less than twice a minimum distance from a first object to the outer envelope of the first object plus twice a minimum distance of a second object to the outer envelope of the second object.

9. The method according to claim 7, wherein the second step size is less than twice a minimum distance from a first object to the inner envelope of the first object plus twice a minimum distance of a second object to the inner envelope of the second object.

10. The method according to claim 1, wherein the first step size and the second step size are functions of a shape of the path line.

11. The method according to claim 1, wherein the path line represents at least one of (a) relative linear movement and (b) relative rotational movements of the objects with respect to each other.

12. The method according to claim 1, wherein each object one of (a) corresponds to one of at least two machine parts that are movable with respect to each other and (b) is arranged on one of at least two machine parts that are movable with respect to each other, the machine parts arranged as components of a machine tool.

13. The method according to claim 12, wherein the objects represent objects for which a collision is physically possible during normal operation of the machine tool.

14. The method according to claim 1, wherein the steps (a) to (e) are performed by simulation by a machine control unit.

15. The method according to claim 14, wherein the machine control unit is adapted to control real movement of the objects as a function of a result of the simulation.

16. The method according to claim 14, wherein the machine control unit is adapted to only allow a movement of real objects with respect to each other after performing the steps (a) to (e) for the path line.

* * * * *